(12) United States Patent
Uchibori et al.

(10) Patent No.: US 12,474,716 B2
(45) Date of Patent: Nov. 18, 2025

(54) UNMANNED AERIAL VEHICLE AND CONTROL METHOD THEREFOR

(71) Applicant: NIPPON TELEGRAPH AND TELEPHONE CORPORATION, Tokyo (JP)

(72) Inventors: Daisuke Uchibori, Tokyo (JP); Yujin Hamano, Tokyo (JP); Masafumi Nakagawa, Tokyo (JP); Atsushi Aratake, Tokyo (JP)

(73) Assignee: NTT, Inc., Tokyo (JP)

( * ) Notice: Subject to any disclaimer, the term of this patent is extended or adjusted under 35 U.S.C. 154(b) by 228 days.

(21) Appl. No.: 17/767,834

(22) PCT Filed: Oct. 9, 2019

(86) PCT No.: PCT/JP2019/039916
§ 371 (c)(1),
(2) Date: Apr. 8, 2022

(87) PCT Pub. No.: WO2021/070308
PCT Pub. Date: Apr. 15, 2021

(65) Prior Publication Data
US 2024/0085928 A1    Mar. 14, 2024

(51) Int. Cl.
*G05D 1/00* (2024.01)
*B64U 20/87* (2023.01)
*B64U 101/30* (2023.01)

(52) U.S. Cl.
CPC ............ *G05D 1/102* (2013.01); *B64U 20/87* (2023.01); *B64U 2101/30* (2023.01); *B64U 2201/10* (2023.01)

(58) Field of Classification Search
CPC .... G05D 1/102; B64U 20/87; B64U 2201/10; B64U 2101/30
See application file for complete search history.

(56) References Cited

U.S. PATENT DOCUMENTS 7,069,124 B1 * 6/2006 Whittaker ............ G05D 1/0274
                                                            701/28
10,954,648 B1 * 3/2021 Blackshaw ............ G06T 17/00
(Continued)

FOREIGN PATENT DOCUMENTS

JP    2007113240 A    5/2007
JP    2014149622 A    8/2014
(Continued)

OTHER PUBLICATIONS

Sanket, Nitin & Singh, Chahat & Ganguly, Kanishka & Fermüller, Cornelia & Aloimonos, Yiannis. (2018). GapFlyt: Active Vision Based Minimalist Structure-Less Gap Detection for Quadrotor Flight. IEEE Robotics and Automation Letters. pp. 10.1109/LRA.2018.2843445. (Year: 2018).*
(Continued)

*Primary Examiner* — Navid Z. Mehdizadeh
*Assistant Examiner* — Oliver Tan (57) ABSTRACT

Provided is a crewless aircraft capable of accurately estimating its own position even inside a manhole, as well as a crewless aircraft control method. A crewless aircraft according to the present invention is a crewless aircraft used to inspect an interior of a manhole, and includes: a camera sensor that captures an image of a manhole opening; a plurality of rangefinders that measure a distance to a ground surface or a predetermined surface in the interior; and a control unit that estimates an own position on the basis of recognition information of the manhole opening obtained by performing recognition on image information obtained from the camera sensor, and distance information of the distance to the ground surface or the predetermined surface obtained from the rangefinders.

8 Claims, 4 Drawing Sheets

(56) References Cited

U.S. PATENT DOCUMENTS

| | | | | |
|---|---|---|---|---|
| 11,348,269 B1* | 5/2022 | Ebrahimi Afrouzi | ... | G01S 17/48 |
| 2003/0101821 A1* | 6/2003 | Thomas | ............... | G01N 29/223 |
| | | | | 73/644 |
| 2016/0162743 A1* | 6/2016 | Chundrlik, Jr. | ........... | B60R 1/00 |
| | | | | 348/148 |
| 2020/0072613 A1* | 3/2020 | Kuzmanovic | ............ | G08G 5/74 |

FOREIGN PATENT DOCUMENTS

| | | | | | |
|---|---|---|---|---|---|
| JP | 2016122237 A | * | 7/2016 | ........... | G06F 3/0481 |
| JP | 2016218813 A | | 12/2016 | | |
| JP | 2017226259 A | | 12/2017 | | |
| JP | 2019036269 A | * | 3/2019 | | |
| JP | 2019101001 A | | 6/2019 | | |
| WO | 2017199940 A1 | | 11/2017 | | |
| WO | 2018061823 A1 | | 4/2018 | | |
| WO | 2019123558 A1 | | 6/2019 | | |

OTHER PUBLICATIONS

JP201722659A MT (Sueishi).*
JP2019036269A MT (Ito).*
Autonomous Target Localization using Quadrotor, Hou et al., IEEE 2014 (Year: 2014).*
Yato et al. (2018) "Development of Unmanned Aerial Vehicles for Closed Spaces such as Sewerage Pipes," Journal of Japan Sewage Works Association, vol. 29, pp. 25-32.
Uchibori et al. "Development of manhole inspection technology for communication by autonomous flight drone", The 74th Annual Academic Lecture of the Japan Society of Civil Engineers National Convention in the first year of Reiwa, VI-477.

* cited by examiner

UNMANNED AERIAL VEHICLE AND CONTROL METHOD THEREFOR

CROSS-REFERENCE TO RELATED APPLICATIONS

This application is a U.S. National Stage Application filed under 35 U.S.C. § 371 claiming priority to International Patent Application No. PCT/JP2019/039916, filed on 9 Oct. 2019, the disclosure of which is hereby incorporated herein by reference in its entirety.

TECHNICAL FIELD

The present invention relates to a crewless aircraft used to inspect the interior of manholes, and a crewless aircraft control method.

BACKGROUND ART

Crewless aircraft which use GPS (Global Positioning System) to estimate their own position and fly autonomously are known. Furthermore, crewless aircraft that use Visual SLAM (Simultaneous Localization and Mapping) technology, which obtains images from a camera provided on the aircraft and processes the images, to estimate their own position and fly autonomously in environments which GPS signals cannot reach are known (for example, see NPL 1).

CITATION LIST

Non Patent Literature

[NPL 1] Yato, Yoshihiko and Yusuke Inagaki, "Development of Unmanned Aerial Vehicles for Closed Spaces such as Sewerage Pipes," Journal of Japan Sewage Works Association, Vol. 29, pp. 25-32, 2018.

SUMMARY OF THE INVENTION

Technical Problem

However, the interior of a manhole, which is an environment which GPS signals cannot reach, is narrow, and generally does not have sufficient flight space for a crewless aircraft to effectively use Visual SLAM technology. There is thus a problem in that inside a manhole, where neither GPS nor Visual SLAM technology can be used, it is difficult for a crewless aircraft to accurately estimate its own position.

Having been achieved in light of such circumstances, an object of the present disclosure is to provide a crewless aircraft capable of accurately estimating its own position even inside a manhole, as well as a crewless aircraft control method.

Means for Solving the Problem

A crewless aircraft according to an embodiment is a crewless aircraft used to inspect an interior of a manhole, and includes: a camera sensor that captures an image of a manhole opening; a plurality of rangefinders that measure a distance to a ground surface or a predetermined surface in the interior; and a control unit that estimates an own position on the basis of recognition information of the manhole opening obtained by performing recognition on image information obtained from the camera sensor, and distance information of the distance to the ground surface or the predetermined surface obtained from the rangefinders.

A method of controlling a crewless aircraft according to an embodiment is a method of controlling a crewless aircraft used to inspect an interior of a manhole. The crewless aircraft includes a camera sensor that captures an image of a manhole opening and a plurality of rangefinders that measure a distance to a ground surface or a predetermined surface in the interior. The method includes: a step of estimating an own position on the basis of recognition information of the manhole opening obtained by performing recognition on image information obtained from the camera sensor, and distance information of the distance to the ground surface obtained from the rangefinders, when the crewless aircraft flies from an above-ground area to a neck part; a step of estimating an own position on the basis of distance information, obtained from the rangefinders, of a distance to a wall surface of the neck part, when the crewless aircraft flies from the neck part to a body part; a step of estimating an own position on the basis of recognition information of the manhole opening obtained by performing recognition on image information obtained from the camera sensor, distance information of a distance to a wall surface of the body part, distance information of a distance to a ceiling surface of the body part, and distance information of a distance to a water surface of a pool present in the body part, when the crewless aircraft flies in the body part, the distance information being obtained from the rangefinders; a step of estimating an own position on the basis of distance information, obtained from the rangefinders, of a distance to the wall surface of the neck part, when the crewless aircraft flies from the body part to the neck part; and a step of estimating an own position on the basis of recognition information of the manhole opening obtained by performing recognition on image information obtained from the camera sensor, and distance information of the distance to the ground surface obtained from the rangefinders, when the crewless aircraft flies from the neck part to the above-ground area.

Effects of the Invention

According to the present disclosure, a crewless aircraft capable of accurately estimating its own position even inside a manhole, as well as a crewless aircraft control method, can be provided.

DESCRIPTION OF EMBODIMENTS

Embodiments for carrying out the present invention will be described hereinafter with reference to the drawings. In the following descriptions, "up", "down", and "vertical" refer to a direction parallel to a Z axis in a coordinate axis indicator illustrated in the drawings, and "horizontal" refers to a direction parallel to an XY plane of the coordinate axis indicator illustrated in the drawings.

Configuration of Crewless Aircraft

Figure 1:
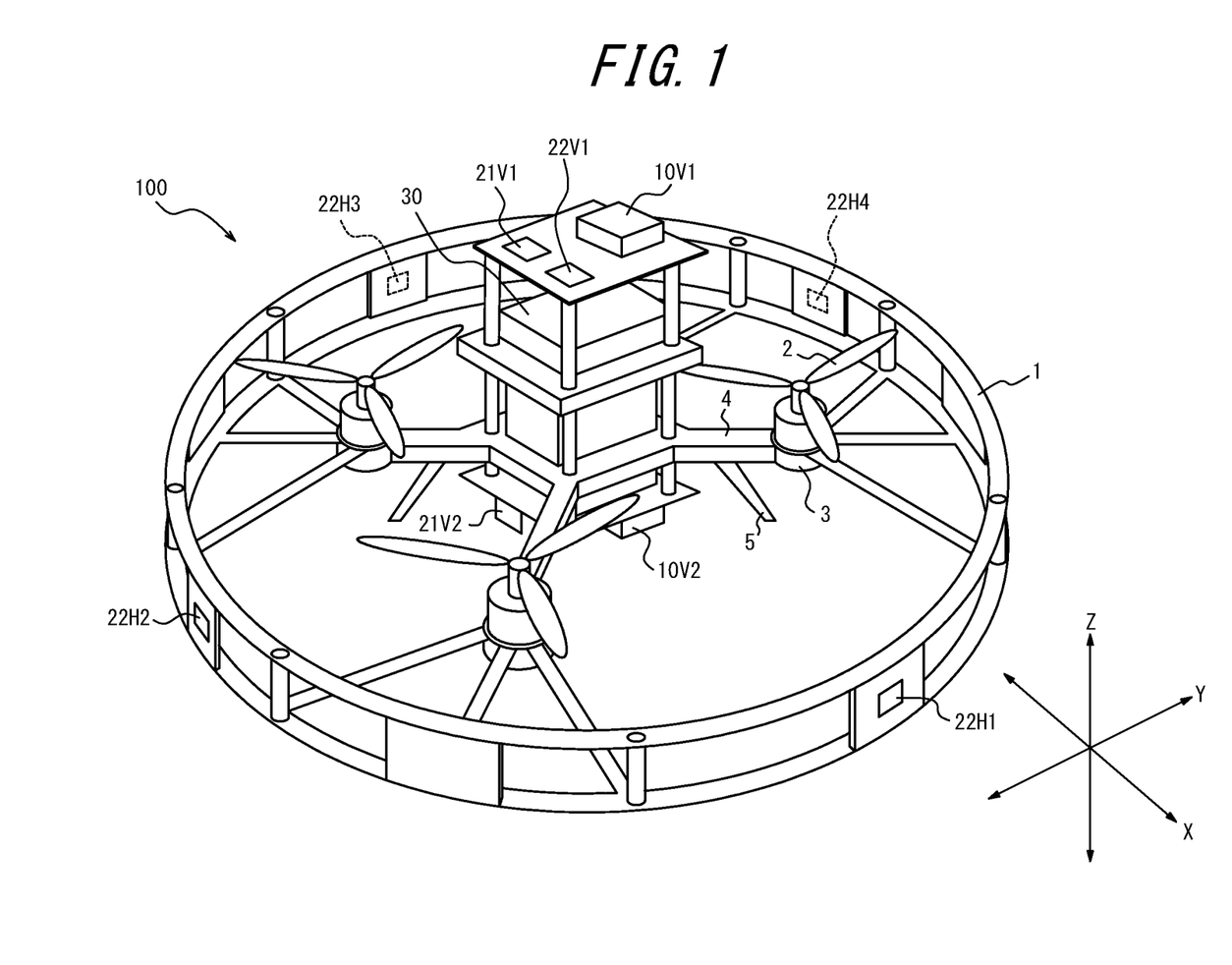
FIG. 1 is a diagram illustrating an example of the configuration of a crewless aircraft according to an embodiment.

The configuration of a crewless aircraft 100 according to an embodiment of the present invention will be described with reference to FIGS. 1 and 2.

The crewless aircraft 100 includes a main body 1, propellers 2, motors 3, arm parts 4, and leg parts 5. The main body 1 includes a plurality of camera sensors 10, a plurality of rangefinders 21 and 22, and a control unit 30.

The main body 1 has a disk shape with a diameter of approximately 420 mm and a height of approximately 230 mm, and is assembled from a CFRP (Carbon Fiber Reinforced Plastics) plate and the like. Propellers 2a, 2b, 2c, and 2d are rotationally driven by motors 3a, 3b, 3c, and 3d which are attached thereto, respectively, and produce lift. Arm parts 4a, 4b, 4c, and 4d are rod-shaped support members, extending in the horizontal direction and rotatably supporting the propellers 2a, 2b, 2c, and 2d. Leg parts 5a, 5b, 5c, and 5d are T-shaped support members, and support the crewless aircraft 100 so as to prevent the crewless aircraft 100 from tipping over during takeoff and landing.

The configuration of a manhole 200 will be briefly described here.

Figure 2:
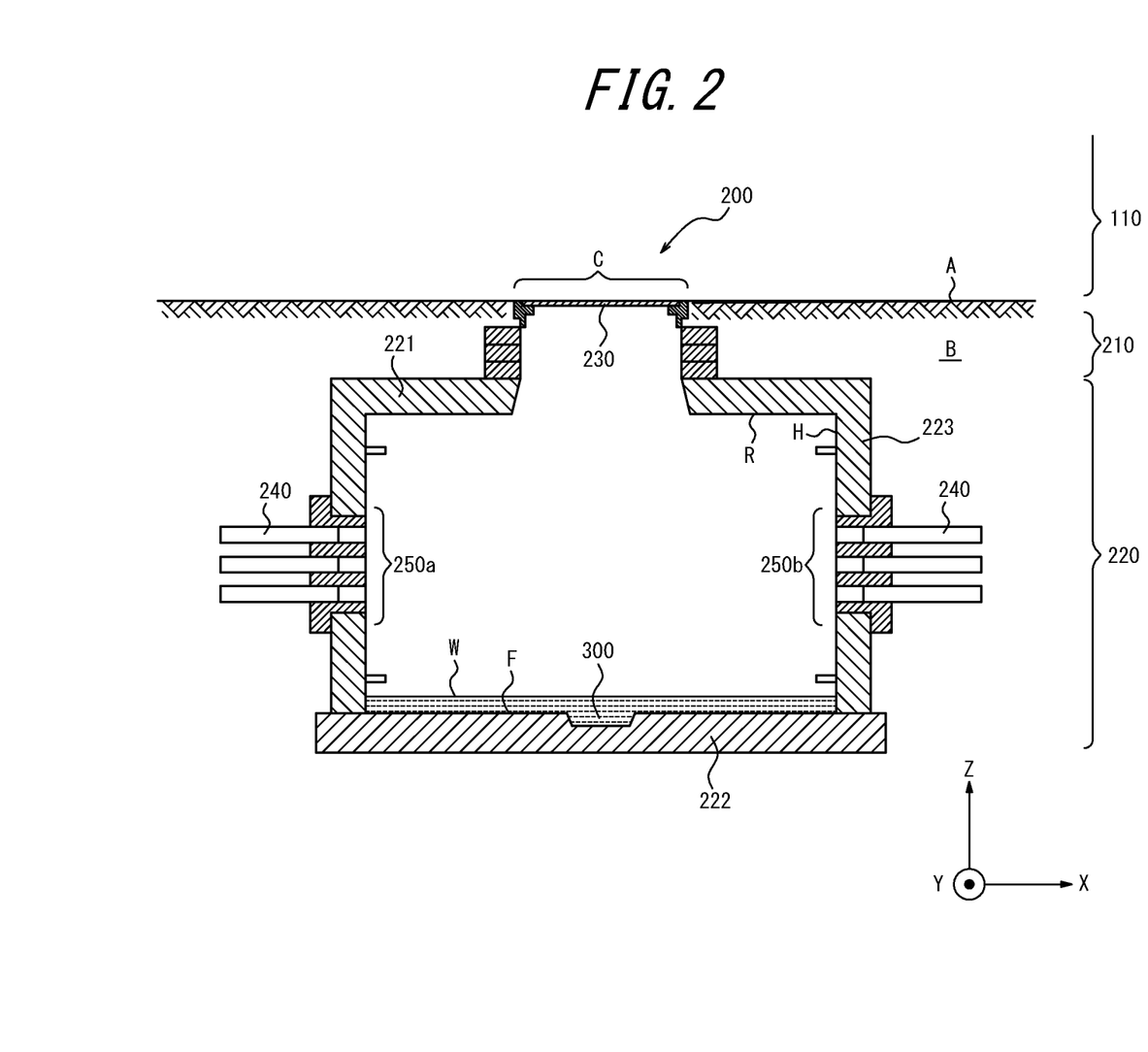
FIG. 2 is a side view illustrating an example of the configuration of a manhole according to an embodiment.

As illustrated in FIG. 2, the manhole 200 is a standard communication manhole. The manhole 200 includes a neck part 210, a body part 220, an iron cover 230, conduits 240, and duct parts 250a and 250b. The body part 220 includes a ceiling part 221, a floor part 222, and a side wall part 223. The interior of the manhole 200 is enclosed by a wall surface H of the neck part 210, a ceiling surface R of the ceiling part 221, a wall surface H of the side wall part 223, a floor surface F of the floor part 222 (or a water surface W of a pool 300), or the like. The neck part 210 has a substantially cylindrical shape which has, for example, a diameter of approximately 60 cm and a height of approximately 60 cm, and is manufactured of reinforced concrete or the like. The height of the neck part 210 indicates a distance between a ground surface A and the ceiling part 221. The body part 220 has, for example, a substantially parallelepiped shape with a length of approximately 2.3 m in an X axis direction, approximately 1.3 m in a Y axis direction, and approximately 1.5 m in a Z axis direction, and, like the neck part 210, is manufactured from reinforced concrete or the like. Through-holes connecting to the plurality of conduits 240 are formed in the side wall part 223, and the duct parts 250a and 250b are provided therein. The iron cover 230 is substantially cylindrical in shape, and fits into a manhole opening C, which is the entrance and exit of the manhole 200. The manhole opening C is formed at a boundary between an above-ground area 110 and an underground area B. The plurality of conduits 240 are lined with communication cables or the like.

The plurality of camera sensors 10, the plurality of rangefinders 21 and 22, and the control unit 30 will be described in detail next.

One or more of the camera sensors 10 are disposed in the vertical direction. The present embodiment will describe the crewless aircraft 100 has including two camera sensors 10V1 and 10V2 in the vertical direction.

The camera sensor 10V1 is disposed in an upper area in the vertical direction, and captures an image of an object. The camera sensor 10V1 captures an image of the manhole opening C, for example. The camera sensor 10V1 outputs, to the control unit 30, image information of the captured object (e.g., the manhole opening C). An operator can adjust the position where the camera sensor 10V1 is disposed as appropriate.

The camera sensor 10V2 is disposed in a lower area in the vertical direction, and captures an image of an object. The camera sensor 10V2 captures an image of the manhole opening C, for example. The camera sensor 10V2 outputs, to the control unit 30, image information of the captured object (e.g., the manhole opening C). The operator can adjust the position where the camera sensor 10V2 is disposed as appropriate.

Two or more of the rangefinders 21 and 22 are provided in the horizontal direction, and one or more in the vertical direction. The rangefinders 21 are, for example, ultrasonic sensors 21V1 and 21V2, and the rangefinders 22 are, for example, laser sensors 22H1, 22H2, 22H3, 22H4, and 22V1. In the present embodiment, the crewless aircraft 100 will be described below as including the four laser sensors 22H1, 22H2, 22H3, and 22H4 in the horizontal direction, as well as the two ultrasonic sensors 21V1 and 21V2 and the one laser sensor 22V1 in the vertical direction.

The ultrasonic sensor 21V1 is disposed in an upper area in the vertical direction, and measures a distance to a target surface. For example, the ultrasonic sensor 21V1 measures a distance to the ceiling surface R within the manhole 200. The ultrasonic sensor 21V1 outputs, to the control unit 30, distance information of the measured distance to the target surface (e.g., the ceiling surface R). The operator can adjust the position where the ultrasonic sensor 21V1 is disposed as appropriate.

The ultrasonic sensor 21V2 is disposed in a lower area in the vertical direction, and measures a distance to a target surface. For example, the ultrasonic sensor 21V2 measures a distance to the ground surface A, a distance to the floor surface F within the manhole 200, or a distance to the water surface W of the pool 300 present in the body part 220. The ultrasonic sensor 21V2 outputs, to the control unit 30, distance information of the measured distance to the target surface (e.g., the ground surface A, the floor surface F, or the water surface W). The operator can adjust the position where the ultrasonic sensor 21V2 is disposed as appropriate.

The laser sensors 22H1, 22H2, 22H3, and 22H4 are disposed in the horizontal direction, and measure a distance to a target surface. For example, the laser sensors 22H1, 22H2, 22H3, and 22H4 measure a distance to the wall surface H within the manhole 200 (the wall surface H of the neck part 210 or the wall surface H of the body part 220). The laser sensors 22H1, 22H2, 22H3, and 22H4 output, to the control unit 30, distance information of the distance to the measured target surface (e.g., the wall surface H of the neck part 210 or the wall surface H of the body part 220). The operator can adjust the positions where the laser sensors 22H1, 22H2, 22H3, and 22H4 are disposed as appropriate.

The laser sensor 22V1 is disposed in an upper area in the vertical direction, and measures a distance to a target surface. For example, the laser sensor 22V1 measures a distance to the ceiling surface R within the manhole 200. The laser sensor 22V1 outputs, to the control unit 30, distance information of the measured distance to the target surface (e.g., the ceiling surface R). The operator can adjust the position where the laser sensor 22V1 is disposed as appropriate.

The control unit 30 is a small computer such as, for example, a RaspberryPi (registered trademark), and controls the various parts of the crewless aircraft 100. In accordance with a flight environment of the crewless aircraft 100 (e.g., the above-ground area 110, the neck part 210, the body part 220, and the like), the control unit 30 controls the various sensors described above, and estimates an own position on the basis of the information obtained from the various sensors.

When obtaining the image information of the object in the vertical direction, the control unit 30 controls the camera sensors 10V1 and 10V2 and obtains the image information of the object from the camera sensors 10V1 and 10V2. For example, in the body part 220, the above-ground area 110, or the like, the control unit 30 controls the camera sensors 10V1 and 10V2 and obtains the image information of the manhole opening C from the camera sensors 10V1 and 10V2.

When obtaining the distance information of the distance to the target surface in an upper area in the vertical direction, the control unit 30 controls the ultrasonic sensor 21V1 or the laser sensor 22V1, and obtains, from the ultrasonic sensor 21V1 or the laser sensor 22V1, the distance information of the distance to the target surface. For example, in the body part 220, the control unit 30 controls the ultrasonic sensor 21V1 or the laser sensor 22V1, and obtains, from the ultrasonic sensor 21V1 or the laser sensor 22V1, the distance information of the distance to the ceiling surface R within the manhole 200.

When obtaining a horizontal distance to the manhole opening in the body part 220, the above-ground area 110, or the like, the control unit 30 controls the camera sensors 10V1 and 10V2, captures an image using the camera sensors 10V1 and 10V2, and recognizes the manhole opening C from the captured image. For example, in the above-ground area 110, the control unit 30 controls the camera sensor 10V2, captures an image in the vertical direction, recognizes the manhole opening C from the captured image, and obtains distance information of the distance, in the horizontal direction, between the manhole opening C and the crewless aircraft. For example, in the body part 220, the control unit 30 controls the camera sensor 10V1, captures an image in the vertical direction, recognizes the manhole opening C from the captured image, and obtains distance information of the distance, in the horizontal direction, between the manhole opening C and the crewless aircraft.

When obtaining the distance information of the distance to the target surface in a lower area in the vertical direction, the control unit 30 controls the ultrasonic sensor 21V2 and obtains, from the ultrasonic sensor 21V2, the distance information of the distance to the target surface. For example, in the above-ground area 110, the control unit 30 controls the ultrasonic sensor 21V2 and obtains, from the ultrasonic sensor 21V2, the distance information of the distance to the ground surface A. For example, in the body part 220, the control unit 30 controls the ultrasonic sensor 21V2 and obtains, from the ultrasonic sensor 21V2, the distance information of the distance to the floor surface F within the manhole 200. For example, in the body part 220, the control unit 30 controls the ultrasonic sensor 21V2 and obtains, from the ultrasonic sensor 21V2, the distance information of the distance to the water surface W of the pool 300 present in the body part 220.

When obtaining distance information of the distance to the target surface in the horizontal direction, the control unit 30 controls the laser sensors 22H1, 22H2, 22H3, and 22H4, and obtains, from the laser sensors 22H1, 22H2, 22H3, and 22H4, the distance information of the distance to the target surface. For example, in the neck part 210, the control unit 30 controls the laser sensors 22H1, 22H2, 22H3, and 22H4, and obtains, from each of the laser sensors, the distance information of the distance to the wall surface H of the neck part 210 within the manhole 200. For example, in the body part 220, the control unit 30 controls the laser sensors 22H1, 22H2, 22H3, and 22H4, and obtains, from each of the laser sensors, the distance information of the distance to the wall surface H of the body part 220 within the manhole 200.

As described above, the control unit 30 controls the various sensors described above in accordance with the flight environment of the crewless aircraft 100. For example, in the above-ground area 110, the control unit 30 measures the distance to the ground surface A using the ultrasonic sensor 21V2, which is less affected by sunlight. Additionally, for example, in the neck part 210, the control unit 30 measures the distance to the wall surface H of the neck part 210 using the laser sensors 22H1, 22H2, 22H3, and 22H4, which are less likely to produce diffuse reflection. Additionally, for example, in the body part 220, the control unit 30 measures the distance to the water surface W using the ultrasonic sensor 21V2, which is less affected by the pool 300.

The control unit 30 estimates the own position using the image information and the distance information obtained from the various sensors in a combined manner. For example, in the above-ground area 110, the control unit 30 estimates the own position using the image information of the manhole opening C and the distance information of the distance to the ground surface A in a combined manner. For example, in the neck part 210, the control unit 30 estimates the own position using the distance information of the wall surfaces H of the neck part 210 in a combined manner. For example, in the body part 220, the control unit 30 estimates the own position using the distance information of the distance to the ceiling surface R, the distance information of the distance to the wall surface H of the body part 220, and the distance information of the distance to the water surface W of the pool 300 present in the body part 220 in a combined manner. The control unit 30 can estimate the own position accurately by controlling the various sensors appropriately according to the flight environment of the crewless aircraft 100.

On the basis of the estimated own position, the control unit 30 controls the driving of the motors 3a, 3b, 3c, and 3d, as well as the rotation speed and rotation direction of the propellers 2a, 2b, 2c, and 2d, to control the flight of the crewless aircraft 100. For example, the control unit 30 controls the flight of the crewless aircraft 100 through PID (Proportional-Integral-Differential Controller) control. By the control unit 30 estimating the own position accurately and controlling the flight of the crewless aircraft 100 on the basis of the own position, the crewless aircraft 100 can fly autonomously, with a high level of accuracy, near the manhole 200 or within the manhole 200.

The operator uses the crewless aircraft 100 to inspect the interior of the manhole 200. After opening the iron cover 230 of the manhole 200, the operator causes the crewless aircraft 100 to fly autonomously near the manhole 200 or within the manhole 200. The operator evacuates to a safe sidewalk or the like, and inspects the interior of the manhole 200 by checking a state of deterioration of the interior of the manhole 200 from the images shot by the crewless aircraft 100. This makes it possible to increase the safety of the inspection process and make the inspection process more efficient.

In the crewless aircraft 100 according to the present embodiment, the control unit 30 controls the various sensors as appropriate in accordance with the flight environment of the crewless aircraft 100, obtains the image information and the distance information, and estimates the own position. This makes it possible to realize a crewless aircraft 100 capable of estimating its own position accurately even within the manhole 200, which is an environment in which GPS cannot be used and which is too small for Visual SLAM technology to be used.

Additionally, the crewless aircraft 100 according to the present embodiment flies autonomously on the basis of the estimated own position. Accordingly, even if the pool 300 is present in the body part 220, the crewless aircraft 100 can fly autonomously within the manhole 200 with a high level of accuracy while maintaining a constant distance to the water surface W.

Crewless Aircraft Control Method

Figure 3:
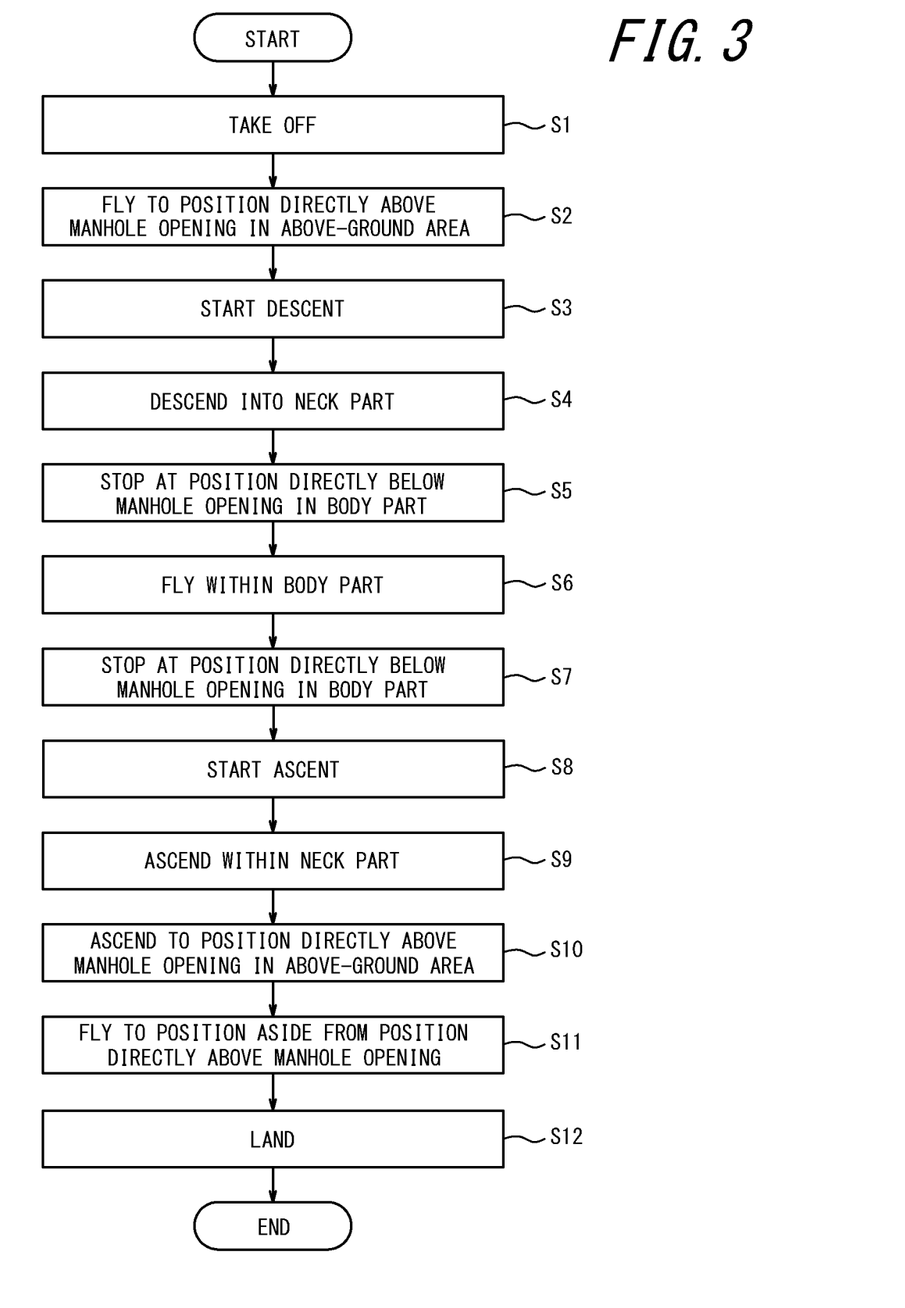
FIG. 3 is a flowchart illustrating an example of a crewless aircraft control method according to an embodiment.
Figure 4:
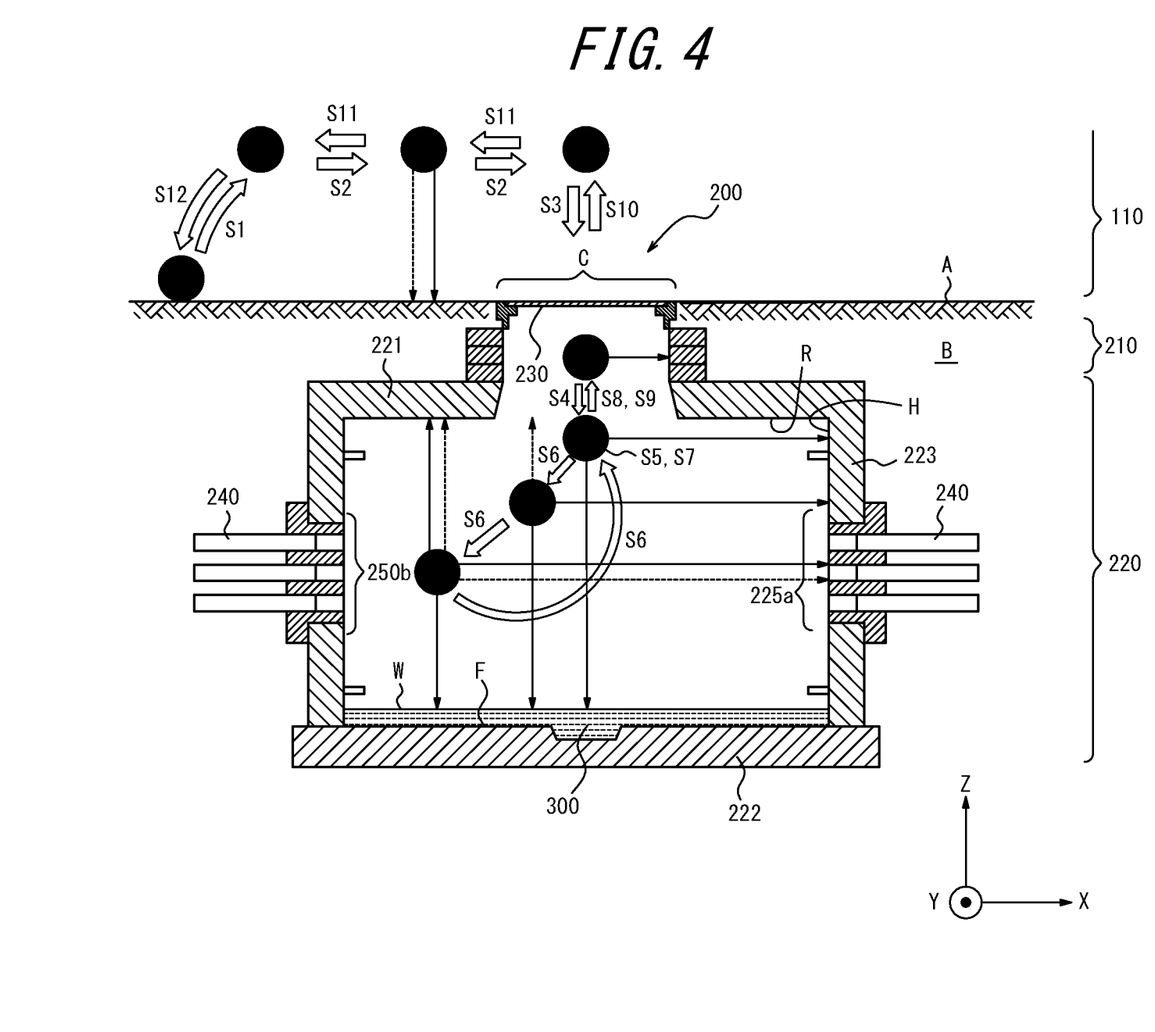
FIG. 4 is a diagram illustrating a crewless aircraft control method according to an embodiment.

A method of controlling the crewless aircraft 100 according to an embodiment of the present invention will be described with reference to FIGS. 3 and 4. In FIG. 4, the black circles indicate the locations of the various sensors (the location of the crewless aircraft 100). The dotted line arrows indicate image capturing directions of the plurality of camera sensors 10. The solid line arrows indicate measurement directions of the plurality of rangefinders 21 and 22.

Control Method in Above-Ground Area 110

In step S1, the control unit 30 causes the crewless aircraft 100 to take off from a takeoff position.

In step S2, the control unit 30 controls the camera sensor 10V2, obtains the image information of the manhole opening C from the camera sensor 10V2, and recognizes the manhole opening C. Additionally, the control unit 30 controls the ultrasonic sensor 21V2 and obtains, from the ultrasonic sensor 21V2, the distance information of the distance to the ground surface A. Then, on the basis of information of the manhole opening C recognized from the captured image obtained from the camera sensor 10V2 and the distance information of the distance to the ground surface A obtained from the ultrasonic sensor 21V2, the control unit 30 recognizes the distance to the manhole opening C and the ground surface A, and estimates the position of the crewless aircraft 100 in the above-ground area 110. Then, the control unit 30 causes the crewless aircraft 100 to fly from the takeoff position to a position directly above the manhole opening C. Even at a position near the position directly above the manhole opening C, the control unit 30 can obtain, from the ultrasonic sensor 21V2, the distance information of the distance to the ground surface A by broadening the directionality of the ultrasonic sensor 21V2.

In step S3, the control unit 30 causes the crewless aircraft 100 to descend from the position directly above the manhole opening C.

Control Method in Neck Part 210

In step S4, the control unit 30 controls the laser sensors 22H1, 22H2, 22H3, and 22H4, and obtains, from the laser sensors 22H1, 22H2, 22H3, and 22H4, the distance information of the distance to the wall surface H of the neck part 210. Then, on the basis of the distance information of the distance to the wall surface H of the neck part 210, obtained from the laser sensors 22H1, 22H2, 22H3, and 22H4, the control unit 30 recognizes the distance to the wall surface H of the neck part 210, and estimates the position of the crewless aircraft 100 in the neck part 210. The control unit 30 then causes the crewless aircraft 100 to descend from an upper area to a lower area of the interior of the neck part 210.

Control Method in Body Part 220

In step S5, the control unit 30 controls the camera sensor 10V1, obtains the image information of the manhole opening C from the camera sensor 10V1, and recognizes the manhole opening C. Additionally, the control unit 30 controls the laser sensors 22H1, 22H2, 22H3, and 22H4, and obtains, from the laser sensors 22H1, 22H2, 22H3, and 22H4, the distance information of the distance to the wall surface H of the body part 220. Additionally, when the pool 300 is present in the body part 220, the control unit 30 controls the ultrasonic sensor 21V2 and obtains, from the ultrasonic sensor 21V2, the distance information of the distance to the water surface W of the pool 300 present in the body part 220. When the pool 300 is not present in the body part 220, the control unit 30 controls the ultrasonic sensor 21V2 and obtains, from the ultrasonic sensor 21V2, the distance information of the distance to the floor surface F of the body part 220. Then, on the basis of recognition information of the manhole opening C from the captured image obtained from the camera sensor 10V1, the distance information of the distance to the wall surface H of the body part 220 obtained from the laser sensors 22H1, 22H2, 22H3, and 22H4, and the distance information of the distance to the water surface W (or the floor surface F) obtained from the ultrasonic sensor 21V2, the control unit 30 recognizes the distance to the wall surface H of the body part 220 and the distance to the water surface W (or the floor surface F). Then, the control unit 30 estimates the position of the crewless aircraft 100 in the body part 220. Then, the control unit 30 causes the crewless aircraft 100 to stop in a position directly below the manhole opening C.

In step S6, the control unit 30 controls the camera sensor 10V1, captures an image using the camera sensor 10V1, and recognizes the manhole opening C from the captured image. Additionally, the control unit 30 controls the laser sensors 22H1, 22H2, 22H3, and 22H4, and obtains, from the laser sensors 22H1, 22H2, 22H3, and 22H4, the distance information of the distance to the wall surface H of the body part 220. Additionally, when the pool 300 is present in the body part 220, the control unit 30 controls the ultrasonic sensor 21V2 and obtains, from the ultrasonic sensor 21V2, the distance information of the distance to the water surface W of the pool 300 present in the body part 220. When the pool 300 is not present in the body part 220, the control unit 30 controls the ultrasonic sensor 21V2 and obtains, from the ultrasonic sensor 21V2, the distance information of the distance to the floor surface F of the body part 220. Then, on the basis of the recognition information of the manhole opening C obtained from the camera sensor 10V1, the distance information of the distance to the wall surface H of the body part 220 obtained from the laser sensors 22H1, 22H2, 22H3, and 22H4, and the distance information of the distance to the water surface W (or the floor surface F) obtained from the ultrasonic sensor 21V2, the control unit 30 recognizes the manhole opening C, the distance to the wall surface H of the body part 220, and the distance to the water surface W (or the floor surface F). Then, the control unit 30 estimates the position of the crewless aircraft 100 in the body part 220. Then, the control unit 30 causes the crewless aircraft 100 to fly as desired, such as ascending, descending, and turning, within the body part 220.

Furthermore, the control unit 30 controls the camera sensor 10V1, captures an image using the camera sensor 10V1, and recognizes the manhole opening C from the captured image. Additionally, the control unit 30 controls the laser sensors 22H1, 22H2, 22H3, and 22H4, and obtains, from the laser sensors 22H1, 22H2, 22H3, and 22H4, the distance information of the distance to the wall surface H of the body part 220. Additionally, the control unit 30 controls the ultrasonic sensor 21V1 or the laser sensor 22V1 and obtains, from the ultrasonic sensor 21V1 or the laser sensor 22V1, the distance information of the distance to the ceiling surface R of the body part 220. Additionally, when the pool 300 is present in the body part 220, the control unit 30 controls the ultrasonic sensor 21V2 and obtains, from the ultrasonic sensor 21V2, the distance information of the distance to the water surface W of the pool 300 present in the body part 220. When the pool 300 is not present in the body part 220, the control unit 30 controls the ultrasonic sensor 21V2 and obtains, from the ultrasonic sensor 21V2, the distance information of the distance to the floor surface F of the body part 220. Then, on the basis of the recognition information of the manhole opening C obtained from the camera sensor 10V1, the distance information of the distance to the wall surface H of the body part 220 obtained from the laser sensors 22H1, 22H2, 22H3, and 22H4, the distance information of the distance to the ceiling surface R obtained from the ultrasonic sensor 21V1 or the laser sensor 22V1, and the distance information of the distance to the water surface W (or the floor surface F) obtained from the ultrasonic sensor 21V2, the control unit 30 recognizes the manhole opening C, the distance to the wall surface H of the body part 220, the distance to the ceiling surface R of the body part 220, and the distance to the water surface W (or the floor surface F). Then, the control unit 30 estimates the position of the crewless aircraft 100 in the body part 220. Then, the control unit 30 causes the crewless aircraft 100 to fly as desired, such as ascending, descending, and turning, within the body part 220.

In step S7, the control unit 30 controls the camera sensor 10V1, captures an image using the camera sensor 10V1, and recognizes the manhole opening C from the captured image. Additionally, the control unit 30 controls the laser sensors 22H1, 22H2, 22H3, and 22H4, and obtains, from the laser sensors 22H1, 22H2, 22H3, and 22H4, the distance information of the distance to the wall surface H of the body part 220. Additionally, when the pool 300 is present in the body part 220, the control unit 30 controls the ultrasonic sensor 21V2 and obtains, from the ultrasonic sensor 21V2, the distance information of the distance to the water surface W of the pool 300 present in the body part 220. When the pool 300 is not present in the body part 220, the control unit 30 controls the ultrasonic sensor 21V2 and obtains, from the ultrasonic sensor 21V2, the distance information of the distance to the floor surface F of the body part 220. Then, on the basis of the recognition information of the manhole opening C obtained from the camera sensor 10V1, the distance information of the distance to the wall surface H of the body part 220 obtained from the laser sensors 22H1, 22H2, 22H3, and 22H4, and the distance information of the distance to the water surface W (or the floor surface F) obtained from the ultrasonic sensor 21V2, the control unit 30 recognizes the distance to the wall surface H of the body part 220 and the distance to the water surface W (or the floor surface F). Then, the control unit 30 estimates the position of the crewless aircraft 100 in the body part 220. Then, the control unit 30 causes the crewless aircraft 100 to stop in a position directly below the manhole opening C.

In step S8, the control unit 30 causes the crewless aircraft 100 to ascend from the position directly below the manhole opening C.

Control Method in Neck Part 210

In step S9, the control unit 30 controls the laser sensors 22H1, 22H2, 22H3, and 22H4, and obtains, from the laser sensors 22H1, 22H2, 22H3, and 22H4, the distance information of the distance to the wall surface H of the neck part 210. Then, on the basis of the distance information of the distance to the wall surface H of the neck part 210, obtained from the laser sensors 22H1, 22H2, 22H3, and 22H4, the control unit 30 recognizes the distance to the wall surface H of the neck part 210, and estimates the position of the crewless aircraft 100 in the neck part 210. The control unit 30 then causes the crewless aircraft 100 to ascend from the lower area to the upper area of the interior of the neck part 210.

Control Method between Neck Part 210 and Above-Ground Area 110

In step S10, the control unit 30 controls the camera sensor 10V2, captures an image using the camera sensor 10V2, and recognizes the manhole opening C from the captured image. Additionally, the control unit 30 controls the ultrasonic sensor 21V2 and obtains, from the ultrasonic sensor 21V2, the distance information of the distance to the ground surface A. Then, on the basis of the recognition information of the manhole opening C obtained from the camera sensor 10V2 and the distance information of the distance to the ground surface A obtained from the ultrasonic sensor 21V2, the control unit 30 recognizes the distance to the manhole opening C and the ground surface A, and estimates the position of the crewless aircraft 100 in the neck part 210 and the above-ground area 110. Then, the control unit 30 causes the crewless aircraft 100 to ascend from the upper area of the neck part 210 to a position directly above the manhole opening C. Even at a position near the position directly above the manhole opening C, the control unit 30 can obtain, from the ultrasonic sensor 21V2, the distance information of the distance to the ground surface A by broadening the directionality of the ultrasonic sensor 21V2.

Control Method in Above-Ground Area 110

In step S11, the control unit 30 controls the camera sensor 10V2, captures an image using the camera sensor 10V2, and recognizes the manhole opening C from the captured image. Additionally, the control unit 30 controls the ultrasonic sensor 21V2 and obtains, from the ultrasonic sensor 21V2, the distance information of the distance to the ground surface A. Then, on the basis of the recognition information of the manhole opening C obtained from the camera sensor 10V2 and the distance information of the distance to the ground surface A obtained from the ultrasonic sensor 21V2, the control unit 30 recognizes the distance to the manhole opening C and the ground surface A, and estimates the position of the crewless aircraft 100 in the above-ground area 110. Then, the control unit 30 causes the crewless aircraft 100 to fly from the position directly above the manhole opening C to a position aside from the position directly above the manhole opening C in the above-ground area 110.

In step S12, the control unit 30 causes the crewless aircraft 100 to land at a landing position.

In a method of controlling the crewless aircraft 100 according to the present embodiment, the control unit 30 estimates its own position by controlling the camera sensors 10, the ultrasonic sensors 21, and the laser sensors 22 disposed on the crewless aircraft 100 as appropriate, obtaining image information and distance information, and using that information in a combined manner, when flying from a takeoff position to the above-ground area 110, flying from the above-ground area 110 to a position directly above the manhole opening C, descending into the neck part 210, stopping in a position directly below the manhole opening C in the body part 220, flying in the body part 220, stopping in a position directly below the manhole opening C in the body part 220, ascending within the neck part 210, flying from the neck part 210 to a position directly above the manhole opening C, flying from the position directly above the manhole opening C to a position aside from the position directly above the manhole opening C, and flying from the position aside from the position directly above the manhole opening C to a landing position. This makes it possible to realize a method of controlling a crewless aircraft 100 capable of estimating its own position accurately even within the manhole 200, which is an environment in which GPS cannot be used and which is too small for Visual SLAM technology to be used.

Additionally, in the method of controlling the crewless aircraft 100 according to the present embodiment, the control unit 30 causes the crewless aircraft 100 to fly autonomously on the basis of the estimated own position. Accordingly, the crewless aircraft 100 can fly autonomously near the manhole 200 or within the manhole 200, the flight including recognizing the manhole opening C in the above-ground area 110, entering the manhole opening C, descending in the neck part 210, flying in the body part 220, recognizing the manhole opening C again in the body part 220, ascending in the neck part 210, and exiting the manhole opening C. Through this, the operator can use the crewless aircraft 100 to inspect the interior of the manhole 200.

Although the foregoing embodiment has been described as a representative example, it will be clear to those skilled in the art that many changes and replacements can be made to the present invention within the essential spirit and scope thereof. As such, it is to be understood that the present invention is not limited in any way by the foregoing embodiment, and can be modified and changed in various ways without departing from the scope of the patent claims.

REFERENCE SIGNS LIST

1 Main body
2a, 2b, 2c, 2d Propeller
3a, 3b, 3c, 3d Motor
4a, 4b, 4c, 4d Arm part
5a, 5b, 5c, 5d Leg part
10V1, 10V2 Camera sensor
21, 22 Rangefinder
21V1, 21V2 Ultrasonic sensor
22H1, 22H2, 22H3, 22H4, 22V1 Laser sensor
30 Control unit
100 Crewless aircraft
110 Above-ground area
200 Manhole
210 Neck part
220 Body part
221 Ceiling part
222 Floor part
223 Side wall part
230 Iron cover
240 Conduit
250a, 250b Duct part

The invention claimed is:

1. A crewless aircraft used to inspect an interior of a manhole, the crewless aircraft comprising:
a camera sensor that captures an image of a manhole opening of a manhole;
a plurality of rangefinders that measure a distance to a predetermined surface in the interior, wherein the plurality of range finders comprises a pair of ultrasound sensors and a plurality of laser sensors;
a disk-shaped body, wherein the disk-shaped body comprises a vertical surface around the disk-shaped body, the vertical surface embeds the plurality of the laser sensors, respective laser sensors of the plurality of laser sensors face horizontally outward and measure respective distances in outward directions from the disk-shaped body, and
respective ultrasound sensors of the pair of ultrasound sensor measure vertical distances; and
a computer that estimates an own position of the crewless aircraft autonomously flying inside the manhole on the basis of recognition information of the manhole opening according to the captured image and distance information of the measured distance to the predetermined surface, thereby updating settings of the crewless aircraft to autonomously fly inside the manhole based on the estimated own position,
wherein the recognition information is obtained from the camera sensor,
the distance information is obtained from the rangefinders,
the crewless aircraft maintains a stop position while flying directly below the manhole opening,
the stop position is based on the estimated own position of the crewless aircraft according to the recognition information of the manhole opening and a distance between the crewless aircraft and the predetermined surface in the interior,
the maintaining the stop position is immediately after descending from the manhole opening and prior to autonomously flying inside a body part of the manhole.

2. The crewless aircraft according to claim 1,
wherein the rangefinders include at least an ultrasonic sensor or a laser sensor.

3. The crewless aircraft according to claim 2,
wherein a first ultrasonic sensor, a first laser sensor, and a first camera sensor are disposed in an upper area of the crewless aircraft in a vertical direction,
a second ultrasonic sensor and a second camera sensor are disposed in a lower area of the crewless aircraft in the vertical direction, and
a plurality of laser sensors are placed in a horizontal direction on the crewless aircraft.

4. The crewless aircraft according to claim 1,
wherein the computer estimates the own position using the recognition information and the distance information in a combined manner.

5. The crewless aircraft according to claim 1,
wherein the computer:
obtains image information of the manhole opening from the camera sensor, recognizes the manhole opening from the image information, and obtains, from the rangefinders, distance information of a distance to the predetermined surface as the crewless aircraft flies from an above-ground area to a neck part,
obtains, from the rangefinders, distance information of a distance to a wall surface of the neck part, when the crewless aircraft flies from the neck part to a body part,
obtains image information of the manhole opening from the camera sensor, recognizes the manhole opening from the image information, and obtains, from the rangefinders, distance information of a distance to a wall surface of the body part, distance information of a distance to a ceiling surface of the body part, and distance information of a distance to a water surface of a pool present in the body part, when flying in the body part, obtains, from the rangefinders, distance information of the distance to the wall surface of the neck part, when the crewless aircraft flies from the body part to the neck part, and obtains image information of the manhole opening from the camera sensor, recognizes the manhole opening from the image information, and obtains, from the rangefinders, distance information of a distance to the predetermined surface, when the crewless aircraft flies from the neck part to the above-ground area.

6. The crewless aircraft according to claim 1, wherein the crewless aircraft further autonomously flies inside the body part of the manhole back to and maintains flying at the stop position directly below the manhole opening based on the estimated own position of the crewless aircraft, immediately prior to autonomously start ascending through the manhole opening.

7. The crewless aircraft according to claim 1, wherein the predetermined surface represents a ground surface of the manhole.

8. A method of controlling a crewless aircraft used to inspect an interior of a manhole, comprising:
　a step of capturing, by a camera sensor of the crewless aircraft, an image of a manhole opening of a manhole and a plurality of rangefinders that measure a distance to a predetermined surface in the interior, wherein the plurality of range finders comprises a pair of ultrasound sensors and a plurality of laser sensors, the crewless aircraft comprises a disk-shaped body, the disk-shaped body comprises a vertical surface around the disk-shaped body, the vertical surface embeds the plurality of the laser sensors, respective laser sensors of the plurality of laser sensors face horizontally outward and measure respective distances in outward directions from the disk-shaped body, and respective ultrasound sensors of the pair of ultrasound sensor measure vertical distances;
　a step of estimating an own position of the crewless aircraft autonomously flying on the basis of recognition information of the manhole opening according to the captured image and distance information of the measured distance to the predetermined surface, wherein the recognition information is obtained by performing recognition of image information obtained from the camera sensor, and wherein the distance information is obtained from the rangefinders, when the crewless aircraft flies from an above-ground area to a neck part inside the manhole;
　a step of estimating the own position of the crewless aircraft autonomously flying on the basis of distance information, obtained from the rangefinders, of a distance to a wall surface of the neck part according to the captured image and distance information of the measured distance to the predetermined surface, thereby updating settings of the crewless aircraft to autonomously fly inside the manhole based on the estimated own position as the crewless aircraft flies from the neck part to a body part inside the manhole,
　wherein the crewless aircraft maintains a stop position while flying directly below the manhole opening,
　the stop position is based on the estimated own position of the crewless aircraft according to the recognition information of the manhole opening and a distance between the crewless aircraft and the predetermined surface in the interior,
　the maintaining the stop position is immediately after descending from the manhole and prior to autonomously flying inside a body part of the manhole;
　a step of estimating the own position of the crewless aircraft autonomously flying on the basis of recognition information of the manhole opening obtained by performing recognition on image information obtained from the camera sensor, distance information of a distance to a wall surface of the body part, distance information of a distance to a ceiling surface of the body part, and distance information of a distance to a water surface of a pool present in the body part thereby updating the settings of the crewless aircraft to autonomously fly inside the manhole based on the estimated own position as the crewless aircraft flies in the body part, the distance information being obtained from the rangefinders;
　a step of estimating the own position of the crewless aircraft autonomously flying on the basis of distance information, obtained from the rangefinders, of a distance to the wall surface of the neck part thereby updating the settings of the crewless aircraft to autonomously fly inside the manhole based on the estimated own position, when the crewless aircraft flies from the body part to the neck part inside the manhole; and
　a step of estimating the own position of the crewless aircraft autonomously flying on the basis of recognition information of the manhole opening obtained by performing recognition on image information obtained from the camera sensor, and distance information of the distance to the predetermined surface obtained from the rangefinders thereby updating the settings of the crewless aircraft to autonomously fly inside the manhole based on the estimated own position, when the crewless aircraft flies from the neck part inside the manhole to the above-ground area.

* * * * *